(12) United States Patent
Otto et al.

(10) Patent No.: US 8,184,867 B2
(45) Date of Patent: May 22, 2012

(54) METHOD AND SYSTEM FOR BIOMETRIC IDENTIFICATION OR VERIFICATION

(75) Inventors: Tilman Otto, Limburgerhof (DE); Frank Mueller, Speyer (DE)

(73) Assignee: Heidelberg Engineering GmbH, Heidelberg (DE)

( * ) Notice: Subject to any disclaimer, the term of this patent is extended or adjusted under 35 U.S.C. 154(b) by 793 days.

(21) Appl. No.: 11/989,922

(22) PCT Filed: Aug. 4, 2006

(86) PCT No.: PCT/EP2006/007758
§ 371 (c)(1),
(2), (4) Date: Mar. 20, 2008

(87) PCT Pub. No.: WO2007/017207
PCT Pub. Date: Feb. 15, 2007

(65) Prior Publication Data
US 2010/0098300 A1    Apr. 22, 2010

(30) Foreign Application Priority Data
Aug. 5, 2005   (DE) .......................... 10 2005 037 675

(51) Int. Cl.
G06K 9/00 (2006.01)
(52) U.S. Cl. ....................................... 382/117; 382/118
(58) Field of Classification Search .......... 382/115–118, 382/154
See application file for complete search history.

(56) References Cited

U.S. PATENT DOCUMENTS

| | | | |
|---|---|---|---|
| 4,109,237 A | | 8/1978 | Hill |
| 4,393,366 A | | 7/1983 | Hill |
| 5,170,276 A | | 12/1992 | Zinser |
| 5,337,043 A | * | 8/1994 | Gokcebay ................... 340/5.67 |
| 5,359,669 A | * | 10/1994 | Shanley et al. ............... 382/117 |
| 6,542,624 B1 | | 4/2003 | Oda |
| 7,027,617 B1 | * | 4/2006 | Frischholz ................... 382/107 |
| 2003/0091215 A1 | * | 5/2003 | Lauper et al. ................. 382/117 |
| 2005/0129286 A1 | | 6/2005 | Hekimian |

FOREIGN PATENT DOCUMENTS

| | | |
|---|---|---|
| EP | 0 061 832 | 10/1982 |
| EP | 0 498 280 | 8/1992 |
| WO | WO-90/00025 | 1/1990 |
| WO | WO-02/07068 | 1/2002 |

OTHER PUBLICATIONS

J. Daugman, "Recognizing Persons by their Iris Patterns"; Biometrics: Personal Identification in Networked Society, Engineering and Computer Science, Norwell, MA: Kluwer Academic Publ, US, 1999, pp. 1-20.

* cited by examiner

*Primary Examiner* — Alex Liew
(74) *Attorney, Agent, or Firm* — Jordan and Hamburg LLP

(57) ABSTRACT

The invention relates to a method for the biometric identification or verification of people. According to said method, biometric characteristics are detected by means of an imaging device and the identification or verification is carried out by means of the detected image data, especially by comparison with known data records and/or original images. The invention also relates to a system for carrying out the method. The aim of the invention is provide one such method and system which significantly improve the anti-violation security in a simple and secure manner. To this end, the retina of the eye is used as a biometric object for detecting the biometric characteristics, and movements and/or the immobility of the eye are detected and taken into account.

9 Claims, 2 Drawing Sheets

Fig. 1
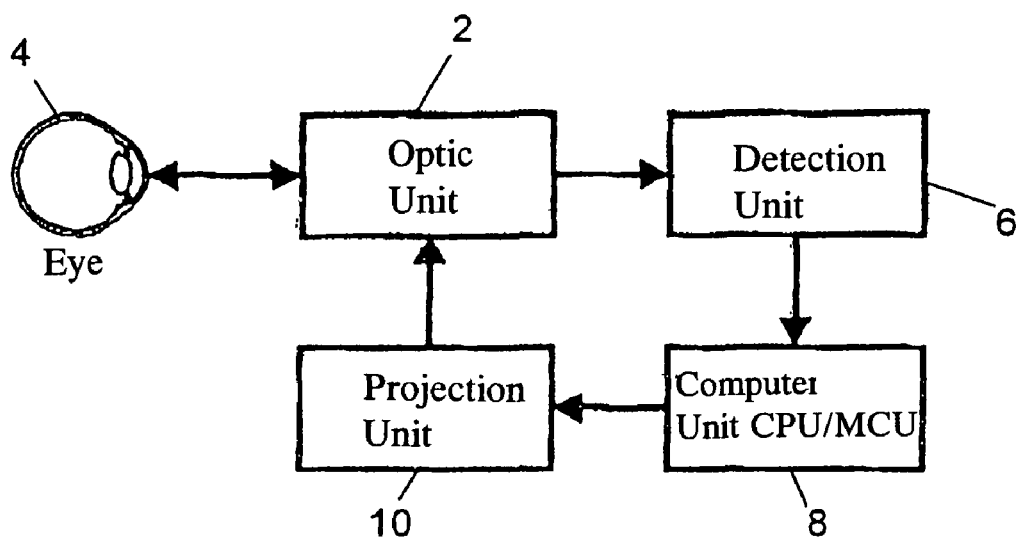
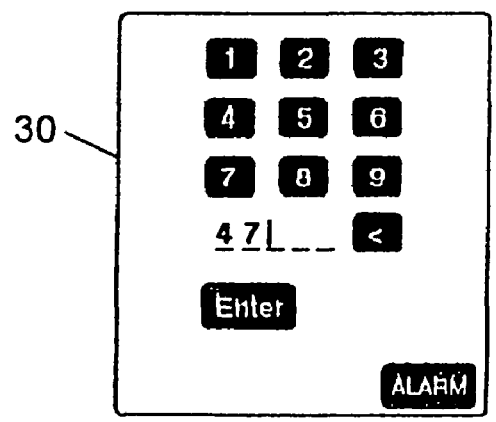
Fig. 3

METHOD AND SYSTEM FOR BIOMETRIC IDENTIFICATION OR VERIFICATION

BACKGROUND OF THE INVENTION

The invention relates to a method for biometric identification or authentication of persons. The invention furthermore relates to a system for performing said method.

It is known that biometric comparisons can be used both for identifying and authenticating persons. When used for identification, the identification occurs without prior knowledge (1:n comparison), wherein the characteristics of a person, having been detected biometrically using a suitable method and/or system, are compared to data sets of a plurality of previously detected persons for the purposes of establishing identity. For this, data sets for the person are stored in particular centrally in the biometric system. In the case of authentication, a selection is examined (1:1 comparison), the biometrically detected characteristics of a person being compared to the characteristics of a previously detected person to determine if there is a match. The data set to be compared can be stored centrally in the biometric system or there is also the option of storing the data set on a medium, such as e.g. a chip card, the person to be authenticated providing the aforesaid medium to the system. In the case of both identification and authentication, the biometric characteristics are calculated by computer from the detected image data. A fundamental problem of biometric methods is that an image of the biometric object, such as fingertip, face, or iris, might not be differentiable from reproductions or copies of the objects, and thus the biometric system can be deceived and the certainty of the identification or authentication cannot be assured. Thus in current biometric methods such as fingerprinting, face, iris, or speech, the biometric object is "freely" accessible. Since fingerprints are left everywhere, it is easy for fingerprint systems to be deceived using copies. Iris scanner systems can also be overcome relatively easily, for instance using specially prepared and/or created contact lenses or simply using photographs of the iris with the correct proportions. It is relatively simple to create suitable copies of a biometrically measured object to be identified. It is a major problem for such biometric systems that as a rule it is not possible to decide whether the object presented for identification or authentication is an original body part or only a reproduction thereof. Moreover, any available biodetection such as for instance thermal, capacitive, or the like can be overcome using relatively simple technical means. The quality of biometric methods and/or systems for identification that use pattern detection algorithms is normally indicated using two parameters, specifically the false rejection rate (FRR) and the false acceptance rate (FAR). The FRR provides the percentage of persons or individuals incorrectly rejected by the system, wherein the two data sets of biometric characteristics that are to be compared originate from the same individual but the system does not make a match. Ideally this figure is 0%. The FAR provides the percentage of persons incorrectly authenticated by the system, wherein the two data sets of biometric characteristics that are to be compared do not originate from the same individual but are still evaluated as a match by the system. This figure is also ideally 0%.

Known from EP 0 498 280 B1, wherein the applicant is the present assignee, is a device for scanning an object with a ray beam in two largely orthogonal directions. This is a diagnostic laser scanning system by means of which a continuous copy of the retina can be made with different wavelengths. The device contains a first scanner and a second scanner, each having a mirror, the axes of rotation of which run in mutually orthogonal planes. The mirror of the first scanner is disposed a prespecified distance from its axis of rotation. The center point of the mirror of the second scanner is arranged in the center of the aforesaid distance between the axis of rotation and the mirror of the first scanner, the ray beam running from the mirror of the first scanner directly to the mirror of the second scanner. An additional optical system is in the beam path between the aforesaid mirrors. This laser scanning system, which is also called a retina scanner, makes it possible to scan the retina with different wavelengths continuously, specifically without mydriasis or dilation of the pupil using medication.

BRIEF SUMMARY OF THE INVENTION

Proceeding herefrom, the underlying object of the invention is to embody the method and the system such that their resistance to attack is substantially improved in a simple manner and with secure functioning. Manipulations such as for instance presenting a reproduction of the object provided for identification should be recognized with certainty and furthermore handling and/or functioning should be simplified.

The inventive method and also the system suggested for performing the method are distinguished by substantially improved resistance to attacks and/or optimized identification and/or authentication of persons. In contrast to other biometric objects, in accordance with the invention the retina is selected as the biometric object, and during the biometric detection complex information is exchanged between the biometric object and the biometric system via the retina. The movements of the eye are detected and taken into account. Thus both involuntary and voluntary movements of the eye are detected and taken into account, in particular voluntary movements prespecified by a pattern. Moreover, movements of the eye can be used to input information, for instance a PIN (personal identification number), corresponding information being associated with the known data sets and/or original images that have been appropriately stored and/or provided. In this context, this communication is secure from snooping in that an outside observer cannot determine what information is exchanged. The underlying idea is that the human retina is difficult to access and can only be reproduced with imaging systems and/or ophthalmological devices, in particular fundus cameras or laser scanning systems. During the identification and/or authentication process the object to be identified or the person to be examined detects image information via the retina and furthermore simultaneously transmits information to the system using prespecifiable movements and/or focussing of the eye. The communication is secret so that for instance an outside observer cannot determine what information is being exchanged between the person and the system. Thus light stimuli can be projected onto the retina during image detection, the system detecting the eye movements and/or focussing of the eye, in particular by means of its biometric retina laser scanner and in particular in real time. In particular the location upon which the person being measured is focussing his/her eye is transmitted as information to the biometric system. The projection of locationally-fixed targets can in particular be provided for the projection of light stimuli onto the retina. In this case, one of a plurality of locationally-fixed, internal LED targets is selected randomly at brief temporal intervals, preferably on the order of magnitude of one second each, and projected onto the retina. If the ocular fundus matches the stored biometric characteristics and furthermore the eye movements follow the superimposed LEDs for a prespecified period, for instance 2 to 3 seconds, the person has been identified. Moreover, any pattern desired can be projected, wherein, in addition to the laser used for the image recording, a second laser is modulated preferably by means of an image-synchronous output unit or a display or a monitor or targets are superimposed. Advantageously, the wavelength of the second laser is removed using a filter, in particular upstream of the detector, so that the superimposed pattern does not appear on the recorded image of the retina. Alternatively, a visible laser can be used for recording the image and modulated, the superimposition occurring in particular alternating with the image recording or an inverse superimposition occurring. In accordance with the invention, there is a check to determine whether the eye follows or has followed the prespecified movement and/or focussing of the eye and/or whether an image shift, in particular using an image comparison to the stored original image or images, can be determined correspondingly to the prespecified movement and/or focussing of the eye. If the eye moves in a certain prespecified direction, for instance up and to the right, and at a certain interval starting from a position in which in particular the original image or an detected image of the eye is located, there is a check to determine whether the eye also moved commensurately and/or is focussed on the prespecified position and/or whether the detected image has shifted corresponding to the aforesaid direction and interval.

Furthermore, in addition to or alternative to the voluntary and/or prespecifiable focussing by the person and/or his/her eye that is/are to be measured and/or identified, parameters can be defined for additional involuntary and/or unpreventable movement patterns, such as saccades or drift, in order to facilitate or even further enhance biodetection. It is possible by means of the inventive method and/or system to decide, advantageously and with great certainty, whether the object presented for identification is an original body part, specifically the eye, or just a reproduction thereof, because such a reproduction is not a "seeing" retina and thus the required communication with the biometrically measured object cannot occur (or can only occur with extreme technical complexity). For superimposable patterns for instance a continuously moving target can be superimposed, the eye movement having to follow the movement of the target. Furthermore, a prespecified area, such as an "alarm" and/or "silent alarm", can additionally be superimposed and as a function of this for instance a siren or a silent alarm, in particular a telephonic alarm, can be triggered. Moreover, numbers or text in particular can superimposed by means of a keypad, wherein a PIN code or a password can be input by briefly focussing on the numbers and/or letters and/or other symbols without an outside person being able to uncover the code or password.

It is suggested in accordance with the invention that an imaging device be used for detecting the biometric characteristics of the retina as a biometric object, wherein during the detection and/or during the identification and/or authentication process image information about the retina is detected from the system and preferably information about eye movements and/or focussing of the eye is simultaneously transmitted to the system. Depending on the prespecified movements and/or the positioning and/or the focussing of the eye, preferably prespecified areas of the retina are detected and/or scanned, and the image comparison is performed in particular with corresponding stored original images or areas or data sets derived therefrom.

Further developments and special embodiments of the invention are provided in the subordinate claims and the subsequent description of one exemplary embodiment.

The invention is explained in greater detail in the following using the exemplary embodiment depicted in the drawings.

BRIEF DESCRIPTION OF THE DRAWINGS

FIG. 1 is a circuit diagram;
FIG. 3 is a numerical keypad for superimposing a superimposable pattern.

DETAILED DESCRIPTION OF THE INVENTION

Figure 2:
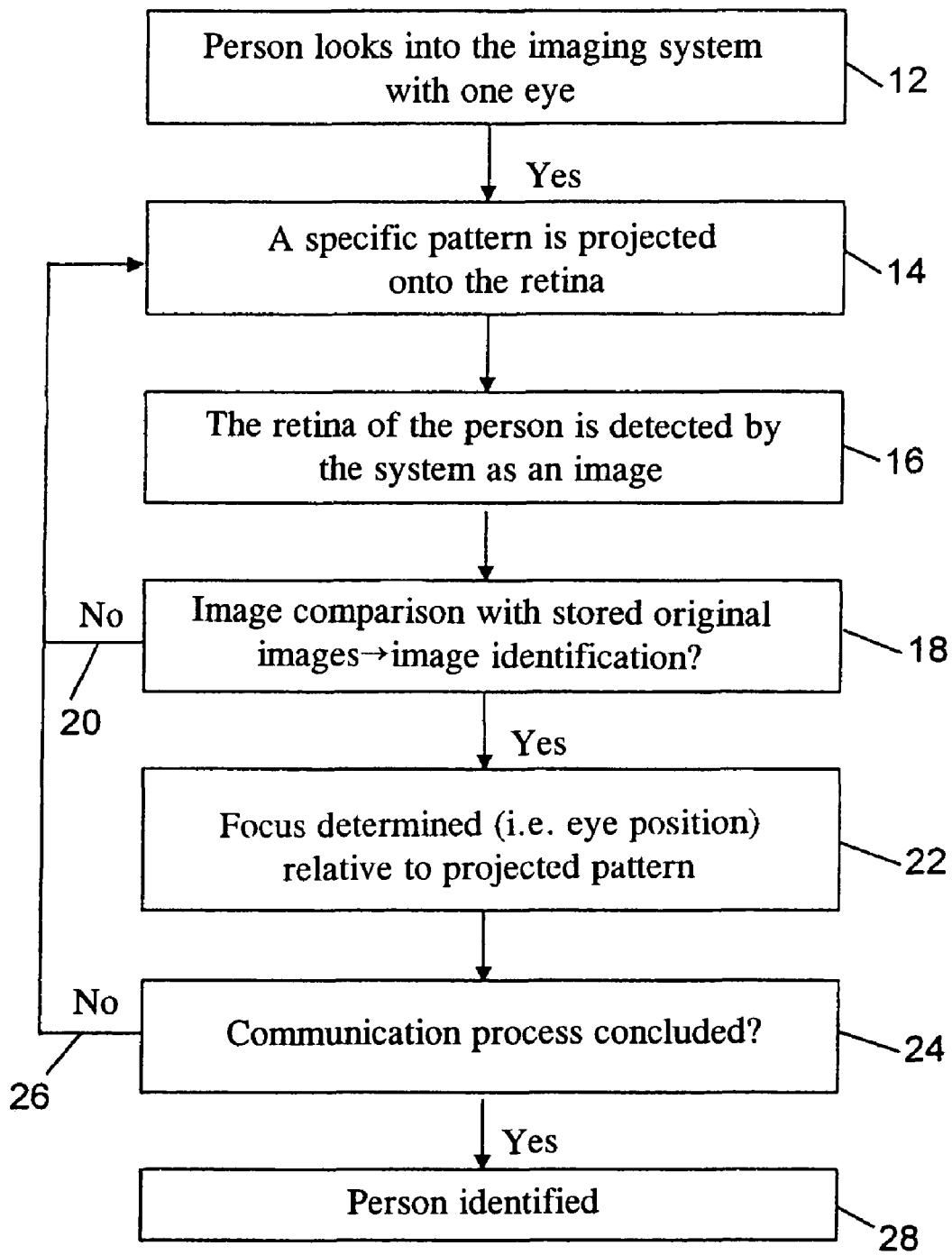
FIG. 2 is a flow chart.

An optics unit 2 for detecting biometric characteristics of an eye 4 is provided in accordance with FIG. 1. Downstream of the optics unit is a detection unit 6 by means of which the detected image data are provided and supplied as electrical signals to a computer 8 that contains in particular a CPU/MCU. Moreover, a projection unit 10 is provided that controls the optics unit 2 corresponding to the data obtained from the computer 8. The optics unit 2 contains a lens that in particular has a fixed focus on zero D so that it is possible to use it with glasses or contact lenses. Moreover, the optics unit 2 contains an imaging system such as in particular an optics block having an X and Y scanner with a prespecified fixed image angle. The image angle is preferably prespecified at about 20° and greater, where possible advantageously 30°. Moreover the optics unit 2 contains the means for resistance to attack that were described in the foregoing, in particular in the form of target LEDs. Also advantageously provided is an infrared proximity sensor by means of which the system or the device is activated when the head of the person to be examined approaches the system or device. When needed, an optics block like that cited in the foregoing for EP 0 498 280 B1 can furthermore be used. An IR laser diode can in particular be used for the light source, but where necessary illumination can be provided by means of LED. Furthermore, a desired light source, for instance a green or red laser diode, can be contained for superimposing patterns to provide resistance to attack.

The computer 8 or the entire electronics unit for the system contains a controller board for controlling scanner and laser. Moreover, the electronics unit contains components for image detection (ADC), for storing comparison data sets, in particular on a flash drive, for superimposing patterns for communication with the person, for evaluating eye movements, and for biometric evaluation or identification and/or authentication. In one special embodiment, for instance for a locking system or a vault, the computer unit 8 or electronics unit usefully contains a separate emergency unlocking electronics unit, a microcontroller, especially an 8 bit-microcontroller, an internal and/or external power supply, and a standardized interface, in particular an RS232 connector, for unlocking the system using a service computer. Thus the microcontroller can be embodied for instance such that a random data key, for instance 1024 bytes, is generated and is transmitted to the service computer. The data key is provided so that the service computer generates from it in an advantageous manner and according to a secret algorithm a clearance code of for instance 1024 bytes and transmits it to the microcontroller. The microcontroller checks the clearance code and where necessary releases the system. The aforesaid microcontroller is in particular usefully arranged separate from the other components of the electronics unit or computer unit 8, in particular in a separate housing, in order for instance to avoid complete loss in case of a fire. The computer unit 8 is advantageously embodied such that the application software can be loaded in a simple manner, in particular from a flash drive. The image processing and likewise the pattern detection preferably occur in real time by means of the software.

The flow chart in accordance with FIG. 2 depicts the essential method steps as function blocks. In accordance with block 12, the person looks into the imaging system and in accordance with block 14 a specific and/or prespecifiable pattern is inventively projected onto the retina of the eye. As depicted in block 16, the image of the retina is detected by means of the system in a known manner, in particular by means of a retina scanner. In accordance with block 18, the image is inventively compared to stored and/or provided original images. If the image cannot be identified, in accordance with line 20 the method is repeated starting from block 14. On the other hand, if the image of the retina is identified, in accordance with block 22 the focus, that is the eye position, is inventively determined with respect to the projected pattern. Alternatively, in accordance with block 22 this determination can be made by means of an external and/or superimposable pattern, for instance in the form of the image of a keypad. Moreover, in the framework of the invention involuntary and/or unavoidable movements or movement patterns of the eye can be used for the determination. Finally and alternatively, in accordance with block 22 the eye movement can be used for inputting information, such as for instance a PIN, corresponding information being assigned to the provided and/or stored original images or their data sets, the aforesaid information being compared for identification and/or authentication. If the communications process cannot be concluded in accordance with block 24, in accordance with line 26 there is a return to block 14, in particular in order to change the pattern if necessary. If the communication process concludes positively, in accordance with block 28 the person has been identified. It is certain that the system resistance to attack is appreciably enhanced due to the communication process between the biometric site, specifically the retina, and the system because a counterfeit retina, such as for instance a graphic copy, could not participate in the active communication process even though it could be identified in terms of image.

FIG. 3 depicts an example of a superimposable pattern in the form of an image of a keypad 30. A pin code or password can be input by focussing on the numbers. In addition, an alarm can be triggered for instance by focussing on the superimposed "Alarm" and then the superimposed "Enter".

In accordance with the invention, the following alternatives for detecting and taking into account eye movements can also be used:

Involuntary movements of the eye are detected for biodetection;

Patterns of voluntary eye movements are prespecified, wherein in particular the pattern is projected onto the eye or there is recognition of an external pattern.

The eye movement is used for inputting information, corresponding information being assigned to the original images or their data sets.

| Symbols | |
|---|---|
| Optics unit | |
| 4 | Eye |
| 6 | Detection unit |
| 8 | Computer unit, CPU/MCU |
| 10 | Projection unit |
| 12-18 | Function block |
| 20 | Line |
| 22, 24 | Function block |

| Symbols | |
|---|---|
| Optics unit | |
| 26 | Line |
| 28 | Function block |
| 30 | Numerical keypad |

The invention claimed is:

1. A method for biometric identification or authentication of persons, comprising:

protecting with a projection unit a display image field onto a retina of a person, wherein different parts of the image field correspond to different images among a plurality of images concurrently projected onto the retina as part of the image field, each of the concurrently projected images being of unique content and unique position within the image field;

detecting with a detection unit biometric retinal characteristics of the retina;

comparing the detected biometric retinal characteristics with stored biometric retinal characteristics of authorized personnel to identify the person;

accessing a database of security sequences in which for each respective authorized person there is stored a respective security sequence, wherein said accessing is to identify the security sequence for the person identified by said comparing;

analyzing a time sequence of detected biometric retinal characteristics of the person to identify whether changes occur at an eye of the person including at least one of voluntary movements, positioning or focus in a manner by which the eye is determined to be positioned to focus on one select image among the plurality of concurrently projected images at one given time while not focusing on other images among the plurality of concurrently projected images, wherein a sequence of different one select images, among the plurality of concurrently projected images in the image field, determined as being focused upon in time sequence defines an input sequence; and determining whether the input sequence corresponds to said accessed security sequence, and indicating said person as being authenticated when said input sequence is determined as corresponding to said accessed security sequence, wherein said determining compares said at least one of voluntary movements, positioning or focus changes of the eye during said input sequence with an expected pattern of pre-specified directions for pre-specified position intervals corresponding to the accessed security sequence to determine whether said eye changes occur to define eye movement in said pre-specified directions for pre-specified position intervals within the projected image field of the plurality of concurrently projected images during the input sequence.

2. A method in accordance with claim 1, wherein the detecting of biometric characteristics of the retina and the at least one of voluntary movements, positioning or focusing of the eye are conducted substantially simultaneously.

3. A method in accordance with claim 2, wherein the at least one of voluntary movements, positioning or focusing of the eye are predetermined.

4. A method in accordance with claim 3, wherein stored biometric retinal characteristics and said database of security sequences are stored in computer memory.

5. A method in accordance with claim 4, wherein depending on the at least one of voluntary movements, positioning or focusing of the eye which are predetermined, predetermined areas of the retina are scanned and detected and are compared to the stored biometric retinal characteristics and said accessed security sequence.

6. A system for biometric identification or verification of persons, comprising:
an imaging device for detecting biometric retinal characteristics of a person by scanning the retina of an eye of a person and detecting at least one of voluntary movements, positioning or focusing of the eye; and
a computer unit comprising a processor and computer memory;
wherein the imaging device projects a display image field onto a retina of a person, wherein different parts of the image field correspond to different images among a plurality of images concurrently projected onto the retina as part of the image field, each of the concurrently projected images being of unique content and unique position within the image field;
wherein the computer memory stores biometric retinal characteristics of authorize personnel and a database of security sequences in which for each respective authorized person there is stored a respective security sequence, each security sequence including pre-specified direction changes for pre-specified position intervals;
wherein the processor performs comparing of the detected biometric retinal characteristics with stored biometric retinal characteristics of authorized personnel to identify the person;
wherein the processor accesses the database of security sequences to identify the security sequence for the person identified by said biometric retinal characteristics comparing;
wherein the processor performs analyzing of a time sequence of detected biometric retinal characteristics of the person to identify whether changes occur at an eye of the person including at least one of voluntary movements, positioning or focus in a manner by which the eye is determined to be positioned to focus on one select image among the plurality of concurrently projected images at one given time while not focusing on other images among the plurality of concurrently projected images, wherein a sequence of different one select images, among the plurality of concurrently projected images in the image field, determined as being focused upon in time sequence defines an input sequence; and
wherein the processor performs determining of whether the input sequence corresponds to said accessed security sequence, and indicates said person as being authenticated when said input sequence is determined as corresponding to said accessed security sequence, wherein said determining compares said at least one of voluntary movements, positioning or focus changes of the eye during said input sequence with an expected pattern of pre-specified directions for pre-specified position intervals corresponding to the accessed security sequence to determine whether said eye changes occur to define eye movement in said pre-specified directions for pre-specified position intervals within the projected image field of the plurality of concurrently projected images during the input sequence.

7. A method in accordance with claim 1, wherein said security sequence is known in advance by the person, said method further comprising detecting movement of the eye of the person corresponding to a portion of a pattern presented to the person during the detecting.

8. A method in accordance with claim 7, wherein said plurality of concurrently projected images are respective keypad element images corresponding to keypad keys among an image field corresponding to a keypad, and wherein said security sequence and input sequence, respectively, are a sequential combination of keys of said keypad.

9. A method for biometric identification and authentication of persons, comprising:
projecting with a projection unit a display image field onto a retina of a person, wherein different parts of the image field correspond to different images among a plurality of images concurrently projected onto the retina as part of the image field, each of the concurrently projected images being of unique content and unique position within the image field;
detecting with a detection unit biometric retinal characteristics of the retina;
comparing the detected biometric retinal characteristics with stored biometric retinal characteristics of authorized personnel to identify the person;
accessing a database of security sequences in which for each respective authorized person there is stored a respective security sequence, wherein said accessing is to identify the security sequence for the person identified by said comparing;
analyzing a time sequence of detected biometric retinal characteristics of the person to identify whether changes occur at an eye of the person including at least one of voluntary movements, positioning or focus in a manner by which the eye is determined to select a sequence of images in the display field from among the plurality of concurrently projected images, said concurrently projected images being the same and maintaining same relative position during said image sequence selection said image sequence selection being an input sequence; and
determining whether the input sequence corresponds to said accessed security sequence, and indicating said person as being authenticated when said input sequence is determined as corresponding to said accessed security sequence, wherein said determining compares said at least one of voluntary movements, positioning or focus changes of the eye during said input sequence with an expected pattern of pre-specified directions for pre-specified position intervals corresponding to the accessed security sequence to determine whether said eye changes occur during the input sequence in a manner corresponding to changes in said pre-specified directions for pre-specified position intervals within the projected image field of the plurality of concurrently projected images.

* * * * *